US011006435B2

(12) United States Patent
Pu et al.

(10) Patent No.: US 11,006,435 B2
(45) Date of Patent: May 11, 2021

(54) COMMUNICATION DEVICE AND METHOD FOR RECEIVING SIGNALS IN A FREQUENCY RANGE

(71) Applicant: Apple Inc., Cupertino, CA (US)

(72) Inventors: Tianyan Pu, Dresden (DE); Chunhui Liu, Dresden (DE); Sabine Roessel, Munich (DE); Christian Drewes, Germering (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/512,461

(22) Filed: Jul. 16, 2019

(65) Prior Publication Data
US 2020/0015244 A1   Jan. 9, 2020

Related U.S. Application Data

(63) Continuation of application No. 15/757,375, filed as application No. PCT/US2016/044953 on Aug. 1, 2016, now Pat. No. 10,405,333.

(51) Int. Cl.
H04W 72/12   (2009.01)
H04W 52/02   (2009.01)
H04W 74/08   (2009.01)
H04W 88/06   (2009.01)
H04W 16/14   (2009.01)
H04W 92/16   (2009.01)

(52) U.S. Cl.
CPC ... *H04W 72/1215* (2013.01); *H04W 52/0274* (2013.01); *H04W 74/0816* (2013.01); *H04W 16/14* (2013.01); *H04W 74/0808* (2013.01); *H04W 88/06* (2013.01); *H04W 92/16* (2013.01)

(58) Field of Classification Search
None
See application file for complete search history.

(56) References Cited

U.S. PATENT DOCUMENTS 8,472,998 B2   6/2013  Black et al.
9,544,798 B1*  1/2017  Ahmadzadeh .... H04W 12/1202
(Continued)

FOREIGN PATENT DOCUMENTS

KR      100825457 B1    4/2008
WO      2011022570 A1   2/2011
WO      2012078993 A2   6/2012

OTHER PUBLICATIONS

International Search Report and Written Opinion, Application No. PCT/US2016/044953, dated Oct. 31, 2016, 10 pages.

*Primary Examiner* — Eunsook Choi
(74) *Attorney, Agent, or Firm* — Kowert, Hood, Munyon, Rankin & Goetzel, P.C.

(57) ABSTRACT

A communication terminal is described comprising a first transceiver configured for communication according to a first radio access technology and a second transceiver configured for communication according to a second radio access technology. The second transceiver is configured to determine whether a frequency range is occupied by a transmission according to the second radio access technology and to notify the first transceiver whether the frequency range is occupied by a transmission according to the second radio access technology. The first transceiver is configured to receive signals transmitted in the frequency range based on the notification from the second transceiver.

20 Claims, 10 Drawing Sheets

(56) References Cited

U.S. PATENT DOCUMENTS

| | | | |
|---|---|---|---|
| 2007/0237121 A1 | 10/2007 | Khandelwal et al. | |
| 2015/0208286 A1* | 7/2015 | Ozturk | H04W 36/0022 370/331 |
| 2015/0373607 A1* | 12/2015 | Zhu | H04W 76/12 370/331 |
| 2016/0095110 A1* | 3/2016 | Li | H04W 72/1215 370/329 |
| 2016/0255648 A1* | 9/2016 | Frenne | H04W 72/0446 370/329 |
| 2017/0055193 A1* | 2/2017 | Mueck | H04W 84/042 |
| 2017/0223698 A1* | 8/2017 | Niu | H04W 76/15 |
| 2018/0351774 A1* | 12/2018 | Heinikoski | H04W 16/14 |

\* cited by examiner

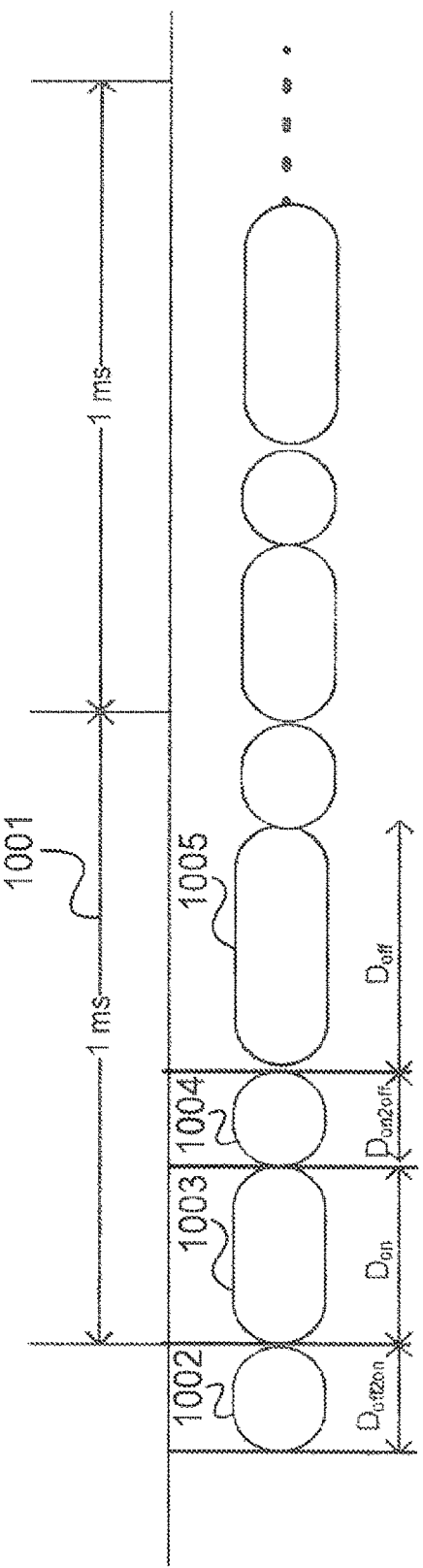

COMMUNICATION DEVICE AND METHOD FOR RECEIVING SIGNALS IN A FREQUENCY RANGE

RELATED APPLICATIONS

The present application is a continuation of U.S. application Ser. No. 15/757,375 filed on Mar. 5, 2018, which is a national stage entry according to 35 U.S.C. § 371 of PCT application No.: PCT/US2016/044953 filed on Aug. 1, 2016, which claims priority from German application No.: 10 2015 115 698.9 filed on Sep. 17, 2015, and is incorporated herein by reference in its entirety.

TECHNICAL FIELD

Embodiments described herein generally relate to communication devices and methods for receiving signals in a frequency range.

BACKGROUND

In view of the increasing load of cellular communication networks, it has been proposed to let cellular communication networks use unlicensed spectrum. For example, for LTE (Long Term Evolution), LTE-LAA (Licensed Assisted Access) and LTE-U (LTE in unlicensed spectrum) have been proposed for the use of 4G LTE communication in unlicensed spectrum such as the 5 GHz band used by dual-band WiFi devices. Efficient approaches for the usage of a frequency range in unlicensed spectrum for communication are desirable.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various aspects are described with reference to the following drawings, in which:

FIG. 10 shows an example of a secondary carrier operation in LAA, when the WiFi AP takes the medium to transmit to illustrate the power benefits which may be achieved with the approach described above.

DESCRIPTION OF EMBODIMENTS

The following detailed description refers to the accompanying drawings that show, by way of illustration, specific details and aspects of this disclosure in which the invention may be practiced. Other aspects may be utilized and structural, logical, and electrical changes may be made without departing from the scope of the invention. The various aspects of this disclosure are not necessarily mutually exclusive, as some aspects of this disclosure can be combined with one or more other aspects of this disclosure to form new aspects.

Figure 1:
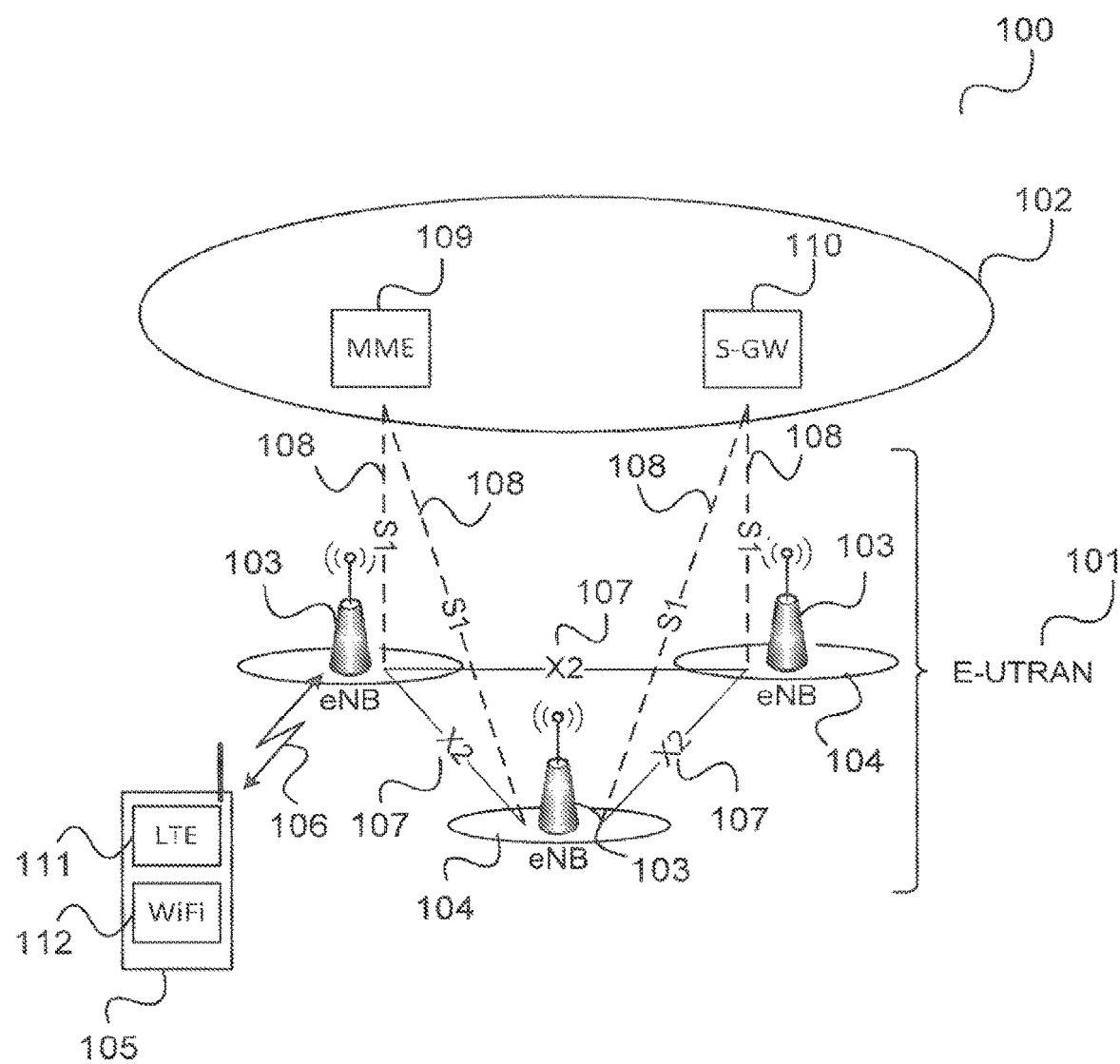
FIG. 1 shows a communication system, for example according to 3GPP.

FIG. 1 shows a communication system 100, for example according to 3GPP (Third Generation Partnership Project).

The communication system 100 may be a cellular mobile communication system (also referred to as cellular radio communication network in the following) including a radio access network (e.g. an E-UTRAN, Evolved UMTS (Universal Mobile Communications System) Terrestrial Radio Access Network according to LTE (Long Term Evolution), or LTE-Advanced) 101 and a core network (e.g. an EPC, Evolved Packet Core, according LTE, or LTE-Advanced) 102. The radio access network 101 may include base stations (e.g. base transceiver stations, eNodeBs, eNBs, home base stations, Home eNodeBs, HeNBs according to LTE, or LTE-Advanced) 103. Each base station 103 may provide radio coverage for one or more mobile radio cells 104 of the radio access network 101. In other words: The base stations 103 of the radio access network 101 may span different types of cells 104 (e.g. macro cells, femto cells, pico cells, small cells, open cells, closed subscriber group cells, hybrid cells, for instance according to LTE, or LTE-Advanced). It should be noted that examples described in the following may also be applied to other communication networks than LTE communication networks, e.g. communication networks according to UMTS, GSM (Global System for Mobile Communications), WIFI etc.

A mobile terminal (e.g. a UE) 105 located in a mobile radio cell 104 may communicate with the core network 102 and with other mobile terminals via the base station 103 providing coverage in (in other words operating) the mobile radio cell 104. In other words, the base station 103 operating the mobile radio cell 104 in which the mobile terminal 105 is located may provide the E-UTRA user plane terminations including the PDCP (Packet Data Convergence Protocol) layer, the RLC (Radio Link Control) layer and the MAC (Medium Access Control) layer and control plane terminations including the RRC (Radio Resource Control) layer towards the mobile terminal 105.

Control and user data may be transmitted between a base station 103 and a mobile terminal 105 located in the mobile radio cell 104 operated by the base station 103 over the air interface 106 on the basis of a multiple access method. On the mobile communication standard air interface, such as LTE air interface 106 different duplex methods, such as FDD (Frequency Division Duplex) or TDD (Time Division Duplex), may be deployed.

The base stations 103 are interconnected with each other by means of a first interface 107, e.g. an X2 interface. The base stations 103 are also connected by means of a second interface 108, e.g. an S1 interface, to the core network 102, e.g. to an MME (Mobility Management Entity) 109 via an S1-MME interface 108 and to a Serving Gateway (S-GW) 110 by means of an S1-U interface 108. The S1 interface 108 supports a many-to-many relation between MMEs/S-GWs 109, 110 and the base stations 103, i.e. a base station 103 may be connected to more than one MME/S-GW 109, 110 and an MME/S-GW 109, 110 may be connected to more than one base station 103. This may enable network sharing in LTE.

For example, the MME 109 may be responsible for controlling the mobility of mobile terminals located in the coverage area of E-UTRAN, while the S-GW 110 may be responsible for handling the transmission of user data between mobile terminals 105 and the core network 102.

In case of mobile communication standard such as LTE, the radio access network 101, i.e. the E-UTRAN 101 in case of LTE, may be seen to consist of the base station 103, i.e. the eNBs 103 in case of LTE, providing the E-UTRA user plane (PDCP/RLC/MAC) and control plane (RRC) protocol terminations towards the UE 105.

Each base station 103 of the communication system 100 may control communications within its geographic coverage area, namely its mobile radio cell 104 that is ideally represented by a hexagonal shape. When the mobile terminal 105 is located within a mobile radio cell 104 and is camping on the mobile radio cell 104 (in other words is registered with a Tracking Area (TA) assigned to the mobile radio cell 104) it communicates with the base station 103 controlling that mobile radio cell 104. When a call is initiated by the user of the mobile terminal 105 (mobile originated call) or a call is addressed to the mobile terminal 105 (mobile terminated call), radio channels are set up between the mobile terminal 105 and the base station 103 controlling the mobile radio cell 104 in which the mobile station is located. If the mobile terminal 105 moves away from the original mobile radio cell 104 in which a call was set up and the signal strength of the radio channels established in the original mobile radio cell 104 weakens, the communication system may initiate a transfer of the call to radio channels of another mobile radio cell 104 into which the mobile terminal 105 moves.

Using its connection to the E-UTRAN 101 and the core network 102, the mobile terminal 105 can communicate with other devices located in other networks, e.g. a server in the Internet, for example for downloading data using a TCP (Transport Control Protocol) connection according to FTP (File Transport Protocol) or for exchanging data (e.g. speech or video data) with another mobile terminal.

Data transmission between the mobile terminal 105 and the corresponding base station 103 (i.e. the base station operating the radio cell in which the mobile terminal 105 is located) is carried out according to a (radio) frame structure. An example of a frame structure is shown in FIG. 2.

Figure 2:
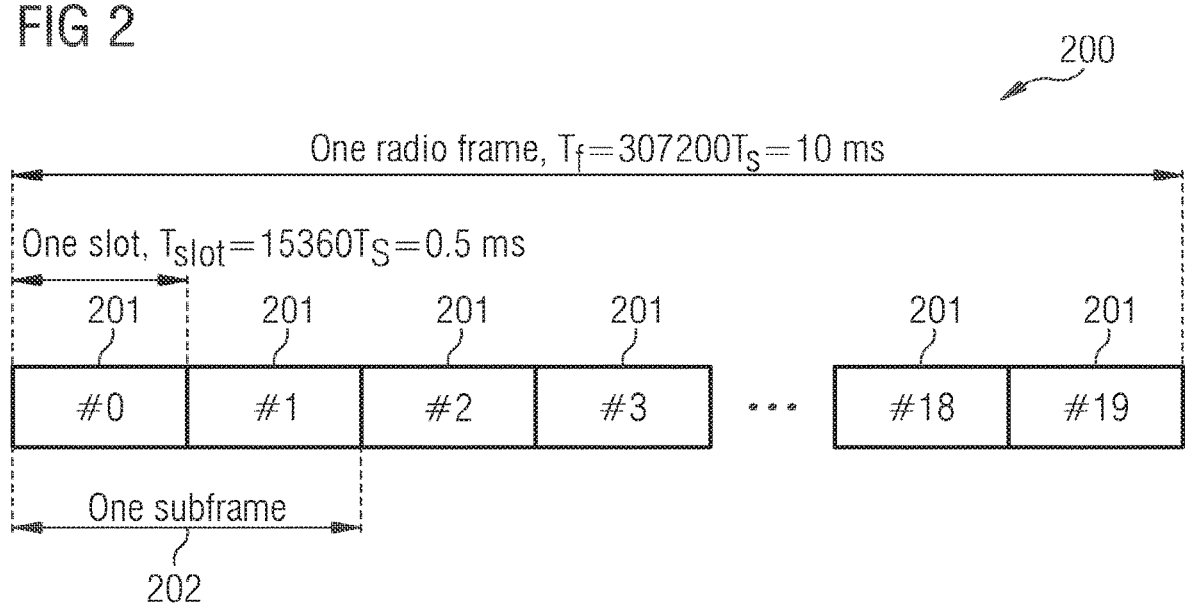
FIG. 2 shows a frame of an exemplary frame structure.

FIG. 2 shows a frame 200 of an exemplary frame structure.

The frame 200 may be used for both full-duplex and half-duplex FDD. The frame 200 is 10 ms long and consists of 20 slots 201 of length 0.5 ms, numbered from 0 to 19. A subframe 202 is defined as two consecutive slots 201. In each 10 ms interval ten subframes 202 are available for downlink transmissions or uplink transmissions. It should however be noted that according to other radio access technologies like e.g. WIFI, a frame may have a different number of subframes than ten and a subframe may include more than two slots.

Uplink and downlink transmissions are separated in the frequency domain. Depending on the slot format a subframe 202 may include 12 or 14 OFDM (orthogonal frequency division multiple access) symbols in DL (downlink) and 12 or 14 SC-FDMA symbols in UL (uplink), respectively.

For being able to communicate with the E-UTRAN 101 the mobile terminal 105 includes an LTE modem 111. The mobile terminal 105 may support other radio access technologies than, in this example, LTE. For example, the mobile terminal 105 further includes a WiFi modem 112 which allows the mobile terminal 105 to establish a connection to a WiFi access point. This is illustrated in FIG. 3.

Figure 3:
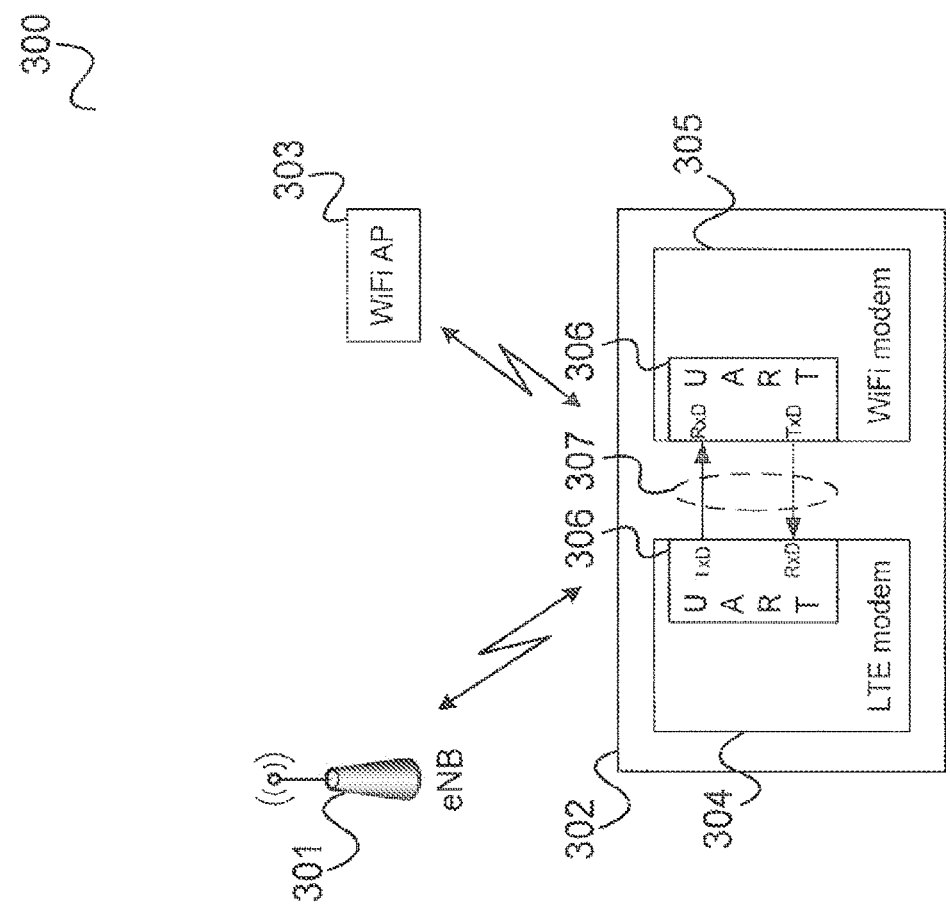
FIG. 3 shows a communication arrangement.

FIG. 3 shows a communication arrangement 300.

The communication arrangement 300 includes an eNodeB 301, for example corresponding to one of the base stations 103, a mobile terminal 302, for example corresponding to the mobile terminal 105 and a WiFi access point (AP) 303 of a wireless local area network (WLAN). The mobile terminal 302 includes an LTE modem 304 and a WiFi modem 305. This allows the mobile terminal 302 to exchange signals with the eNodeB 301 as well as with the WiFi access point 303. Both the LTE modem 304 and the WiFi modem 305 have an UART (Universal Asynchronous Receiver Transmitter) 306 which implements an UART interface 307 between the LTE modem 304 and the WiFi modem 305. The UART interface 307 implements an IDC (in-device coexistence) interface between the modems 304, 305.

The ever-increasing mobile broadband traffic load leads to a pressing need for additional spectral resources of cellular systems such as the communication system 100, which are deployed in the spectrum mainly from 700 MHz to 2.6 GHz. On the other hand, the amount of unlicensed spectrum assigned or currently planned to be assigned is comparable to or even more than the amount of licensed spectrum such as used by WiFi. Therefore, to further expand LTE capacity to meet the traffic demands, a natural way is to integrate unlicensed carrier into the overall LTE system by adapting the LTE air interface to operate in the unlicensed spectrum. Accordingly, in the future, LTE and WiFi can be expected to have both access to, for example, the ISM 5 GHz spectrum, which may lead to interference between these two radio access technologies.

The LTE Licensed-Assisted Access (LAA) Carrier Aggregation deployment means aggregating a primary cell, using licensed spectrum (e.g. licensed by an LTE mobile network operator), to deliver critical information and guaranteed Quality of Service, and a co-located secondary cell, i.e. using a secondary carrier, using unlicensed spectrum (e.g. WiFi spectrum), to opportunistically boost throughput. There are two deployment options:

a. Secondary carrier on unlicensed spectrum used for supplemental downlink capacity only b. Secondary carrier on unlicensed spectrum used for both supplemental downlink and uplink capacity.

In the following, deployment option a, i.e. usage of unlicensed spectrum for downlink transmissions (i.e. transmissions from a base station to a communication terminal) are addressed.

Since it is very popular to have mobile communication devices to be equipped with both LTE and WiFi modems that mutually interfere when operating over the same unlicensed frequency band, for 5 GHz operation, for example, Listen-Before-Talk (LBT) is enforced by EU and Japan regulations in order to impose a flexible and fair coexistence among various systems by enabling quick channel sensing (of several micro seconds) and dynamic channel occupancy (e.g. <13 ms).

For LBT an LTE modem 304 may first blindly detect a downlink signal type, i.e. detect whether a downlink signal transmitted over a secondary carrier (i.e. a carrier of the secondary cell) is an LTE signal (possibly transmitted by base station 301) or a WiFi signal (possibly transmitted by access point 303), before a further processing. A similar procedure may be used by a WiFi modem 305.

However, such a signal type detection requires RF on (e.g. an activated radio frequency reception) for the secondary cell, which is typically a main contributor to the power consumption of an LTE modem 304. In other words, when the LTE UE 302 is operating a secondary downlink carrier over the unlicensed spectrum, both the LTE 304 and the WiFi modem 305 keep RF on (i.e. radio reception activated) to perform consistent signal type detection. This induces a big waste of power and significantly reduces the battery life of the communication terminal 302.

Furthermore, although LBT is employed, signal collision may still occasionally occur between LTE and WiFi. When the LTE modem 304 monitors the radio link to the LTE base station 301 and reports the link quality back to the LTE base station 301 such an occasional collision may result in a bad estimation of link quality and this may lead to significant reduction of throughput when the base station 301 in response performs radio link adaption such as an adaptation of the modulation and coding scheme (MCS) to be more robust but allowing lower throughputs.

In the following, a communication terminal is described which allows usage of an unlicensed band (e.g. usage of LTE-U or usage of LTE-LAA) at a reduced power consumption and at a reduced risk for a false estimation of link quality.

Figure 4:
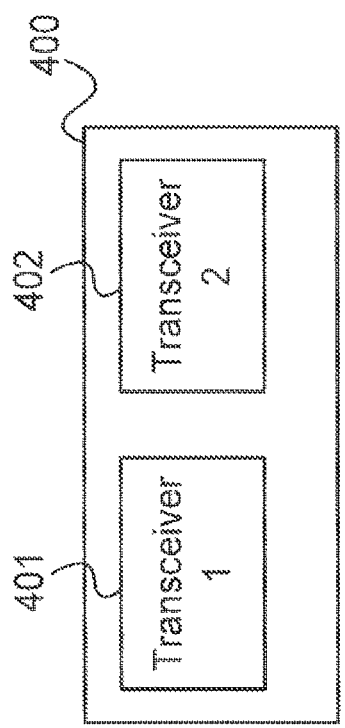
FIG. 4 shows a communication terminal.

FIG. 4 shows a communication terminal 400.

The communication terminal 400 includes a first transceiver 401 configured for communication according to a first radio access technology and a second transceiver 402 configured for communication according to a second radio access technology.

The second transceiver 402 is configured to determine whether a frequency range is occupied by a transmission according to the second radio access technology and to notify the first transceiver 401 whether the frequency range is occupied by a transmission according to the second radio access technology and the first transceiver 401 is configured to receive signals transmitted in the frequency range based on the notification from the second transceiver 402.

In other words, a transceiver for a second radio access technology (e.g. WiFi) of a communication terminal informs a transceiver for a first radio access technology (e.g. LTE) of the communication terminal about whether a frequency range (e.g. a channel) is currently used by a transmission of the second radio access technology. The transceiver for the first radio access technology can then react accordingly and for example stop reception or pause reception in the frequency range to save power or to avoid an unjustified bad reception quality in the frequency range. The first transceiver 401 may for example pause reception until the start of a following time transmission interval (TTI, e.g. a subframe in case of LTE) at which the frequency range is no longer occupied (e.g. the earliest TTI that is no longer occupied).

For example, the first radio access technology (RAT) is a Wireless Wide Area Network (WWAN) RAT and the second RAT is a Wireless Local Area Network (WLAN) RAT. Thus, the communication device for example uses WLAN radio access technology (e.g. WiFi) to reserve a frequency range and then uses the reserved frequency range for WWAN communication, e.g. LTE-LAA communication in a WLAN frequency band, such as the 5 GHz band used according to IEEE 802.11a.

A Wireless Wide Area Network (WWAN) may be understood as a wide radio network, in other words a radio network with a large coverage, e.g. a cellular radio network for mobile phones. In contrast to a Wireless Local Area Network (WLAN) the WWAN covers a larger (outdoor) communication distance. Examples for WWANs include LTE, WiMAX, GSM and UMTS radio communication networks.

A Wireless Local Area Network (WLAN) may be understood to refer to a local radio network, e.g. according to a standard of the IEEE 802.11 family. A WLAN according to a standard of the IEEE 802.11 family is also referred to as WiFi radio network.

The components of the communication device (e.g. the transceivers) may for example be implemented by one or more circuits. A "circuit" may be understood as any kind of a logic implementing entity, which may be special purpose circuitry or a processor executing software stored in a memory, firmware, or any combination thereof. Thus a "circuit" may be a hard-wired logic circuit or a programmable logic circuit such as a programmable processor, e.g. a microprocessor. A "circuit" may also be a processor executing software, e.g. any kind of computer program. Any other kind of implementation of the respective functions which will be described in more detail below may also be understood as a "circuit".

Figure 5:
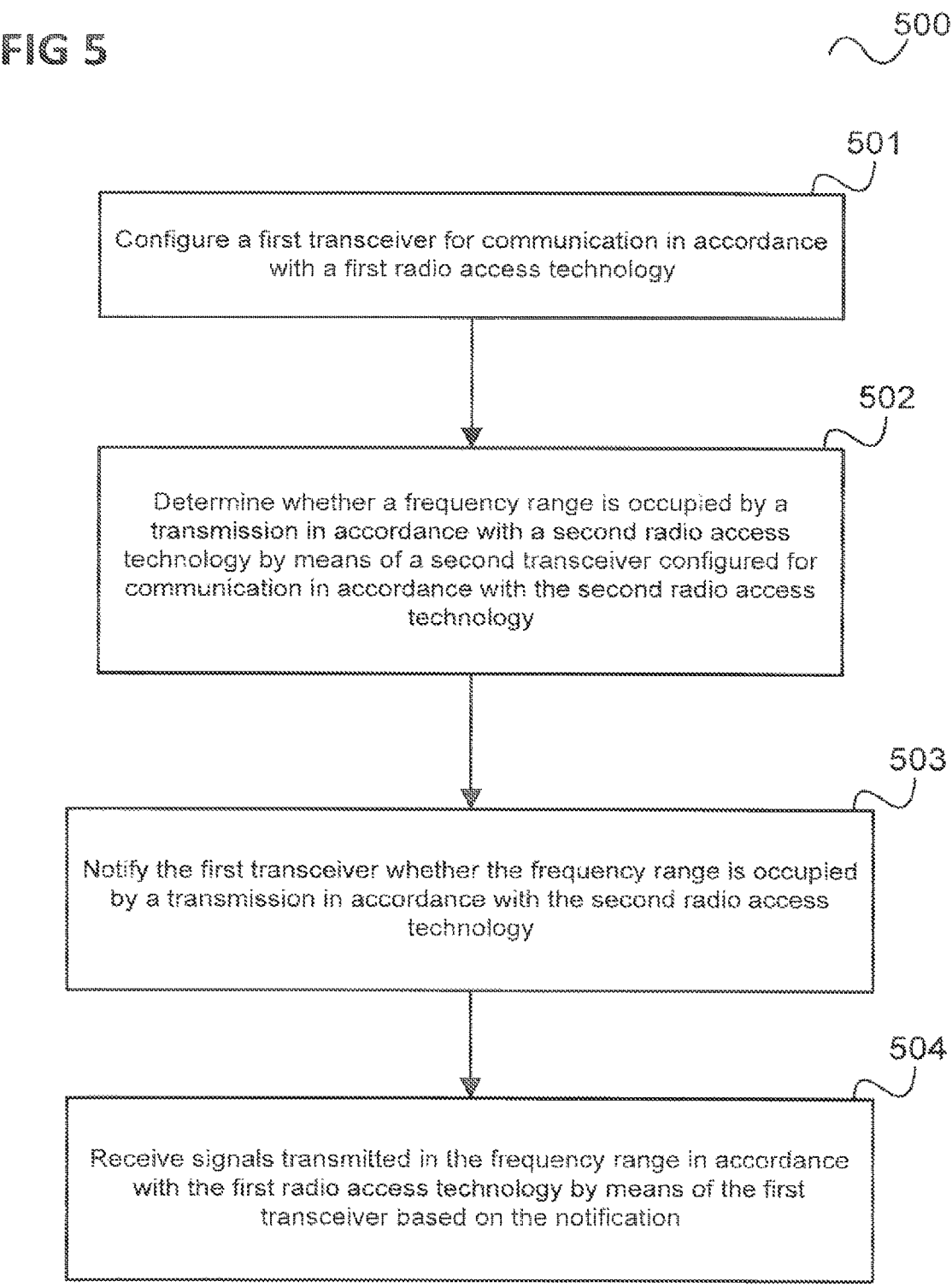
FIG. 5 shows a flow diagram illustrating a method for receiving signals in a frequency range.

The communication device for example carries out a method as illustrated in FIG. 5.

FIG. 5 shows a flow diagram 500 illustrating a method for receiving signals in a frequency range, for example performed by a communication device.

In 501, the communication device configures a first transceiver for communication according to a first radio access technology.

In 502, the communication device determines whether a frequency range is occupied by a transmission according to a second radio access technology by means of a second transceiver configured for communication according to the second radio access technology.

In 503, the communication device notifies the first transceiver whether the frequency range is occupied by a transmission according to the second radio access technology.

In 504, the communication device receives signals transmitted in the frequency range according to the first radio access technology by means of the first transceiver based on the notification.

The following examples pertain to further embodiments.

Example 1 is a communication terminal as illustrated in FIG. 4.

In Example 2, the subject matter of Example 1 may optionally include the first transceiver being configured to refrain from receiving signals transmitted in the frequency range if the frequency range is occupied by a transmission according to the second radio access technology.

In Example 3, the subject matter of any one of Examples 1-2 may optionally include the first transceiver being configured to refrain from receiving signals transmitted in the frequency range until a time transmission interval starting time according to a frame structure of the first radio access technology at which the occupation by the transmission according to the second radio access technology has stopped.

In Example 4, the subject matter of any one of Examples 1-3 may optionally include the first transceiver being configured to enter a sleep mode if the frequency range is occupied by a transmission according to the second radio access technology.

In Example 5, the subject matter of Example 4 may optionally include the sleep mode including the deactivation of at least one of a radio frequency receiver and a baseband receiver of the first transceiver.

In Example 6, the subject matter of any one of Examples 1-5 may optionally include the notification including an indication of a length of the occupation of the frequency range by a transmission according to the second radio access technology.

In Example 7, the subject matter of Example 6 may optionally include the first transceiver being configured to refrain from receiving signals transmitted in the frequency range for the length of the occupation of the frequency range by a transmission according to the second radio access technology.

In Example 8, the subject matter of any one of Examples 1-7 may optionally include the first transceiver being configured to resume receiving signals transmitted in the frequency range after the occupation of the frequency range by a transmission according to the second radio access technology.

In Example 9, the subject matter of any one of Examples 1-8 may optionally include the first transceiver being configured to determine, for a signal it receives via the frequency range, whether the signal is a signal transmitted according to the first radio access technology or a signal transmitted according to the second radio access technology.

In Example 10, the subject matter of any one of Examples 1-9 may optionally include the first transceiver being configured to determine a radio link quality based on signals transmitted in the frequency range according to the first radio access technology.

In Example 11, the subject matter of any one of Examples 1-10 may optionally include the first radio access technology being wireless wide area network radio access technology.

In Example 12, the subject matter of any one of Examples 1-11 may optionally include the first radio access technology being LTE and the first transceiver being an LTE modem.

In Example 13, the subject matter of any one of Examples 1-12 may optionally include the second radio access technology being wireless local area network radio access technology.

In Example 14, the subject matter of any one of Examples 1-13 may optionally include the second radio access technology being WiFi and the second transceiver being a WiFi modem.

In Example 15, the subject matter of any one of Examples 1-14 may optionally include the frequency range being a frequency range of the ISM band.

In Example 16, the subject matter of any one of Examples 1-15 may optionally include the communication terminal being a subscriber terminal of a cellular communication network according to the first radio access technology.

In Example 17, the subject matter of Example 16 may optionally include the first transceiver being configured to receive downlink signals transmitted by a base station of the cellular communication network in the frequency range based on the notification.

In Example 18, the subject matter of any one of Examples 1-17 may optionally include the frequency range corresponding to a frequency channel of the second radio access technology.

In Example 19, the subject matter of any one of Examples 1-18 may optionally include the second transceiver being configured to notify the first transceiver whether the frequency range is occupied by a transmission according to the second radio access technology via an in-device coexistence interface between the first transceiver and the second transceiver.

In Example 20, the subject matter of any one of Examples 1-19 may optionally include the first transceiver being further configured to determine whether the frequency range is occupied by a transmission according to the first radio access technology and to notify the second transceiver whether the frequency range is occupied by a transmission according to the first radio access technology; and the second transceiver being configured to receive signals transmitted in the frequency range based on the notification from the first transceiver.

Example 21 is a method for receiving signals in a frequency range as illustrated in FIG. 5.

In Example 22, the subject matter of Example 21 may optionally include the first transceiver refraining from receiving signals transmitted in the frequency range if the frequency range is occupied by a transmission according to the second radio access technology.

In Example 23, the subject matter of any one of Examples 21-22 may optionally include the first transceiver refraining from receiving signals transmitted in the frequency range until a time transmission interval starting time according to a frame structure of the first radio access technology at which the occupation by the transmission according to the second radio access technology has stopped.

In Example 24, the subject matter of any one of Examples 21-23 may optionally include the first transceiver entering a sleep mode if the frequency range is occupied by a transmission according to the second radio access technology.

In Example 25, the subject matter of Example 24 may optionally include the sleep mode including the deactivation of at least one of a radio frequency receiver and a baseband receiver of the first transceiver.

In Example 26, the subject matter of any one of Examples 21-25 may optionally include the notification including an indication of a length of the occupation of the frequency range by a transmission according to the second radio access technology.

In Example 27, the subject matter of Example 26 may optionally include the first transceiver refraining from receiving signals transmitted in the frequency range for the length of the occupation of the frequency range by a transmission according to the second radio access technology.

In Example 28, the subject matter of any one of Examples 21-27 may optionally include the first transceiver resuming receiving signals transmitted in the frequency range after the occupation of the frequency range by a transmission according to the second radio access technology.

In Example 29, the subject matter of any one of Examples 21-28 may optionally include the first transceiver determining, for a signal it receives via the frequency range, whether the signal is a signal transmitted according to the first radio access technology or a signal transmitted according to the second radio access technology.

In Example 30, the subject matter of any one of Examples 21-29 may optionally include the first transceiver determining a radio link quality based on signals transmitted in the frequency range according to the first radio access technology.

In Example 31, the subject matter of any one of Examples 21-30 may optionally include the first radio access technology being wireless wide area network radio access technology.

In Example 32, the subject matter of any one of Examples 21-31 may optionally include the first radio access technology being LTE and the first transceiver being an LTE modem.

In Example 33, the subject matter of any one of Examples 21-32 may optionally include the second radio access technology being wireless local area network radio access technology.

In Example 34, the subject matter of any one of Examples 21-33 may optionally include the second radio access technology being WiFi and the second transceiver being a WiFi modem.

In Example 35, the subject matter of any one of Examples 21-34 may optionally include the frequency range being a frequency range of the ISM band.

In Example 36, the subject matter of any one of Examples 21-35 may optionally include the first transceiver and the second transceiver being transceivers of a subscriber terminal of a cellular communication network according to the first radio access technology.

In Example 37, the subject matter of Example 36 may optionally include the first transceiver receiving downlink signals transmitted by a base station of the cellular communication network in the frequency range based on the notification.

In Example 38, the subject matter of any one of Examples 21-37 may optionally include the frequency range corresponding to a frequency channel of the second radio access technology.

In Example 39, the subject matter of any one of Examples 21-38 may optionally include the second transceiver notifying the first transceiver whether the frequency range is occupied by a transmission according to the second radio access technology via an in-device coexistence interface between the first transceiver and the second transceiver.

In Example 40, the subject matter of any one of Examples 21-39 may optionally include the first transceiver determining whether the frequency range is occupied by a transmission according to the first radio access technology and notifying the second transceiver whether the frequency range is occupied by a transmission according to the first radio access technology; and the second transceiver receiving signals transmitted in the frequency range based on the notification from the first transceiver.

Example 41 is a computer readable medium having recorded instructions thereon which, when executed by a processor, make the processor perform a method for receiving signals in a frequency range according to any one of Examples 21 to 40.

It should be noted that one or more of the features of any of the examples above may be combined with any one of the other examples.

In the following, embodiments are described in more detail with reference to an architecture as illustrated in FIG. 3.

In the following examples, to reduce power consumption due to signal type detection and to avoid throughput degradation due to occasional traffic collisions, the communication terminal 302 uses an in-device coexistence (IDC) approach, according to which the LTE modem 304 and the WiFi modem 305 exchange information about on-air downlink radio traffic. In doing so, unnecessary signal type detection can be avoided by both the LTE modem 304 and the WiFi modem 305 to reduce the power consumption of the communication terminal 302.

The approach described in the following uses the IDC interface implemented by the UART interface 307 (which is typically present in modern communication terminals) between the LTE modem 304 and the WiFi modem 305. Over the UART interface 307, the LTE modem 304 and the WiFi modem 305 can receive UART characters from each other. Thus, the LTE modem 304 and the WiFi modem 305 can exchange information about LTE and WiFi on-air downlink radio traffic, e.g. notify each other about occupation of a WiFi channel by a WiFi transmission or an LTE transmission, respectively.

Figure 6:
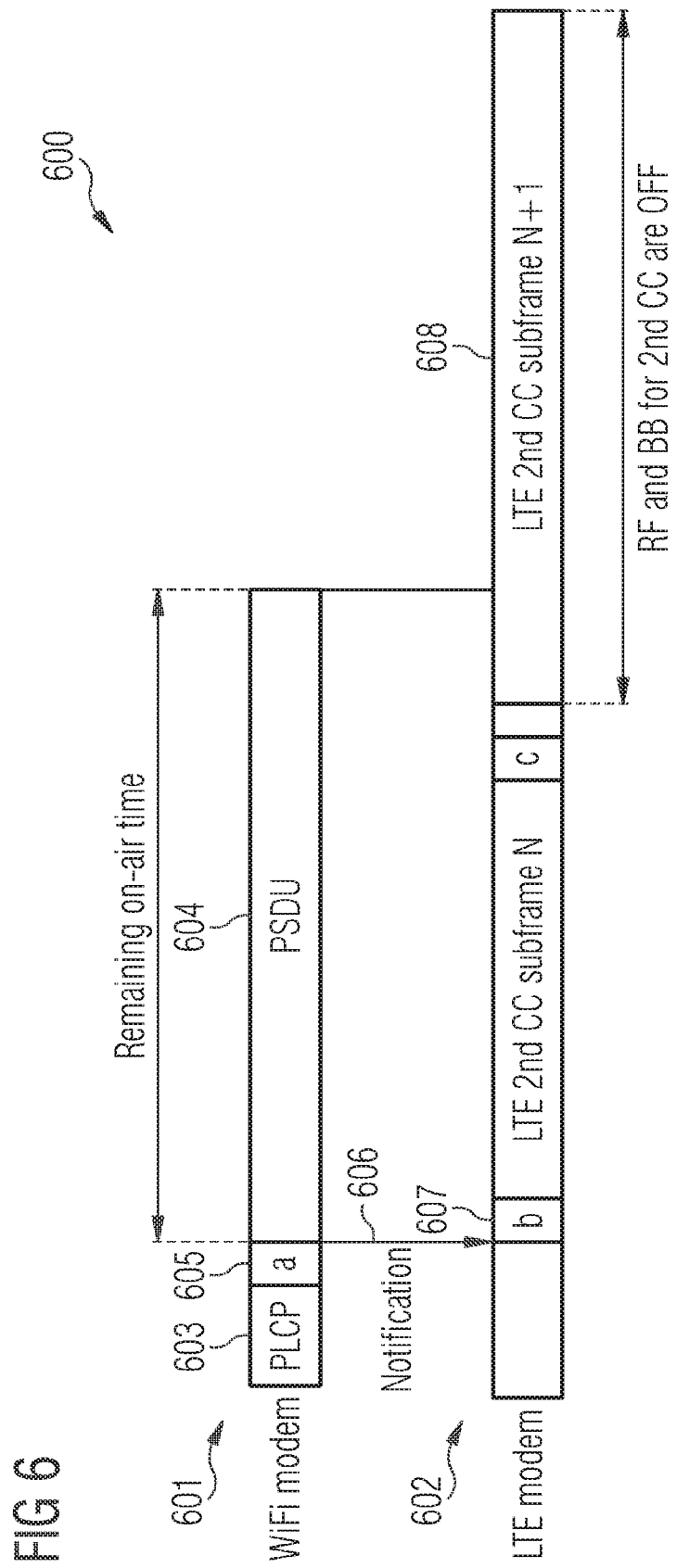
FIG. 6 shows a time diagram including a first diagram showing the activity of a WiFi modem and a second diagram showing the activity of a LTE Modem.

When the base station 301 applies LBT and operates LTE over a secondary carrier over the same frequency band as used by the access point 303, the WiFi modem 305 may thus send information about WiFi traffic (e.g. transmissions from the access point 303) to the LTE modem 304, as illustrated by FIG. 6.

FIG. 6 shows a time diagram 600 including a first diagram 601 showing the activity of the WiFi modem 305 and a second diagram 602 showing the activity of the LTE Modem 304 (wherein the same horizontal position corresponds to the same time). Time flows from left to right in FIG. 6.

Firstly, the WiFi modem 305 receives and successfully decodes a physical payer convergence procedure (PLCP) header 603 of a following PLCP Service Data Unit (PSDU) block 604 which may or may not be addressed to the communication terminal (or UE in the present example) 302. The WiFi modem 305, during 605, extracts PSDU length and modulation and coding scheme from the PLCP header 603 and notifies the LTE modem 304 of the remaining on-air duration of the packet (including the PSDU 604) via the IDC interface 307 by means of a notification. The WiFi modem 305 may for example only consider a PSDU in such a way that is transmitted from the WiFi access point (AP) 303 that adopts LBT associated with the attached LTE eNB 301.

On reception of the notification 606 from the WiFi modem 305 in 607, if LTE modem 304 is currently receiving data from the base station 301 over its secondary carrier (in WiFi spectrum), the LTE modem 304 gets aware of the traffic collision between the WiFi transmission and the LTE transmission. The LTE modem 304 may then ignore the received symbols (e.g. OFDM symbols) for link quality estimation or may react in other ways in order to protect the link quality report or other activities. Since such a collision typically does no often occur, it is typically unnecessary to move the secondary carrier to another band.

When LTE modem 304 is about to start reception for the secondary carrier in a TTI (in the current example, for LTE, a subframe 608), it checks, at a checking point 609, whether WiFi traffic is already ongoing according to the notification 606 provided by the WiFi modem 305:

1) If the WiFi modem 305 has not reported any WiFi traffic, the LTE modem activates its RF receiver and baseband (BB) receiver and starts signal reception and signal type sensing of the signals received via the secondary carrier.

2) Otherwise, the LTE modem 304 computes how many upcoming TTIs (subframes) overlap with the WiFi traffic. During this period of time, it can switch off the receiver chain for the secondary carrier including the RF receiver and the baseband receiver (e.g. the baseband processor) in order to save power. Then, it sets up a timer running until the next checking point. When the timer expires, it repeats the checking and reacts accordingly according to 1) or 2).

In the other direction, i.e., from the LTE modem 304 to the WiFi 305, the LTE modem 304 may also send information about LTE traffic using the secondary carrier over the IDC interface 307. After physical downlink control channel (PDCCH) decoding for a received LTE signal, the LTE modem 305 can notify the WiFi modem 305 of the remaining on-air time for the current TTI (subframe) and thus the WiFi modem 305 can switch off its receiver chain during this period of time.

Furthermore, when the WiFi modem 305 has not indicated that WiFi traffic is present, the LTE modem 304 may still experience strong interference. If this consistently or periodically occurs, it implies that third-party interference is present in the frequency range. Since WiFi traffic has not been indicated by the WiFi modem 305, the LTE modem 305 can distinguish such a collision from a collision with WiFi traffic of the access point 303. Such a third party or hidden interference nodes might be a WiFi access point not supporting LBT, a Bluetooth device, a neighboring LTE base station or other radio devices.

The WiFi modem 305 can sense hidden interference nodes as well. The WiFi modem 305 and the LTE modem 304 can then report such a situation to higher layer components of the communication terminal 302, which report this situation to the base station 301. Then, the base station may move the secondary carrier to another band (e.g. according to Rel-13 3GPP) to resolve the conflict.

The sharing of information about on-air radio traffic duration between the WiFi modem 305 and the LTE modem 304 can significantly reduce the power consumption for signal type detection when LBT is employed in an LTE-U scenario. This is because both LTE modem 304 and WiFi modem 305 can refrain from unnecessary signal detection and medium sensing, if the activity of their respective counterpart (WiFi modem 305 or LTE modem 304, respectively) is notified.

Moreover, system performance advantages can be gained. Firstly, even if the base station 301 employs LBT, signal collision may still occasionally occur between LTE and WiFi communication. Since the LTE modem 304 typically monitors the radio link to the base station 301 and reports the link quality back to the LTE eNB 301, such an occasional collision may result in bad estimates of channel quality, which may result in significant throughput degradation. With the notification approach as described above with reference to FIG. 4, e.g. via the IDC interface 307, LTE link reporting can be protected from a WiFi interference bias and the eNB 301 can avoid unnecessary band reassignment for the secondary carrier. Further, evolved LAA deployments typically require efficient LBT that also allows the overall system 300 to avoid WiFi-to-LTE interference or LTE-to-WiFi interference related to WiFi nodes hidden from the eNB 301 and hence undiscoverable by network-based LBT. To indicate hidden WiFi node presence to the eNB 301, the in-device coexistence (IDC) approach (e.g. as described with reference to FIG. 4) is for example used to detect persistent WiFi transmission despite eNB LBT attempts as both LTE modem 304 and WiFi modem 305 are persistently detecting meaningful but mutually interfering signals. Different reactions are possible in this case:

(1) The mobile terminal 302 reports consistently a channel quality indicator CQI=0 to signal to the eNB 301 that there is a fundamental issue with LTE SCell (secondary cell) transmission. The base station may then permanently deactivate/de-configure the SCell or use beamforming for the transmission.

(2) The mobile terminal 302 prefers a certain PMI (Precoding Matrix Indicator) in its CSI (Channel State Information) reports to the base station 301 to guide the eNB 301 to beamforming, thus hopefully (at least) improving LTE-to-WiFi interference.

To provide hidden WiFi node assistance information (by corresponding signaling), the above-mentioned approach to detect persistent WiFi transmission despite eNB LBT attempts may be used and the mobile terminal may signal related information like WiFi signal power as well as potential WiFi transmission patterns to the eNB 301.

An evolved LAA system may also support LAA Dual Connectivity (potentially provided in 3GPP Rel-14) with a licensed spectrum PCell (primary cell) and unlicensed spectrum SCell (secondary cell). For such a case the IDC approach may be used to perform UE based Listen-Before-Talk (LBT).

As explained above, the LTE modem 304 and the WiFi modem 305 may share locally detected signal over-air duration information via the IDC interface 307, in this example via an UART interface using UART characters.

Figure 7:
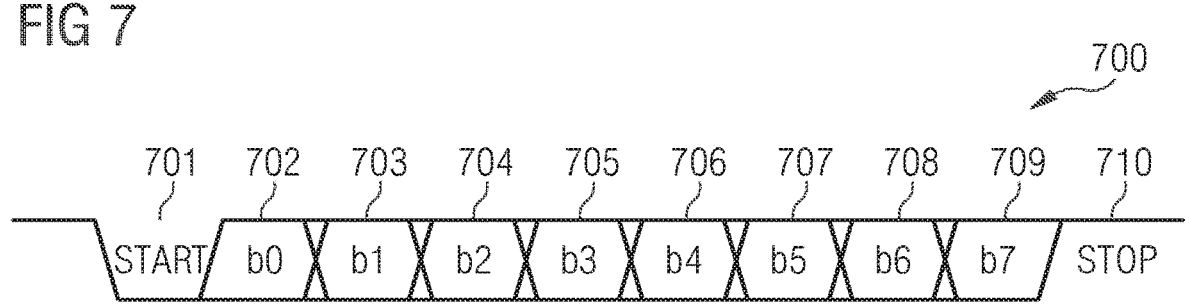
FIG. 7 shows the bit structure of an UART character.

FIG. 7 shows the bit structure of an UART character 700.

As shown in FIG. 7, one UART 700 character is composed of 10 bits 701 to 710. The first bit 701 and the last bit 710 are used by the respective receiving UART 306 to detect the UART character transmitted over the interface 307. The 8 bits in-between 702 to 709 are effective data. The LTE modem 304 and the WiFi modem 305 can exchange such UART characters over the UART interface 307.

In the following, an example is described in more detail with reference to FIG. 8.

Figure 8:
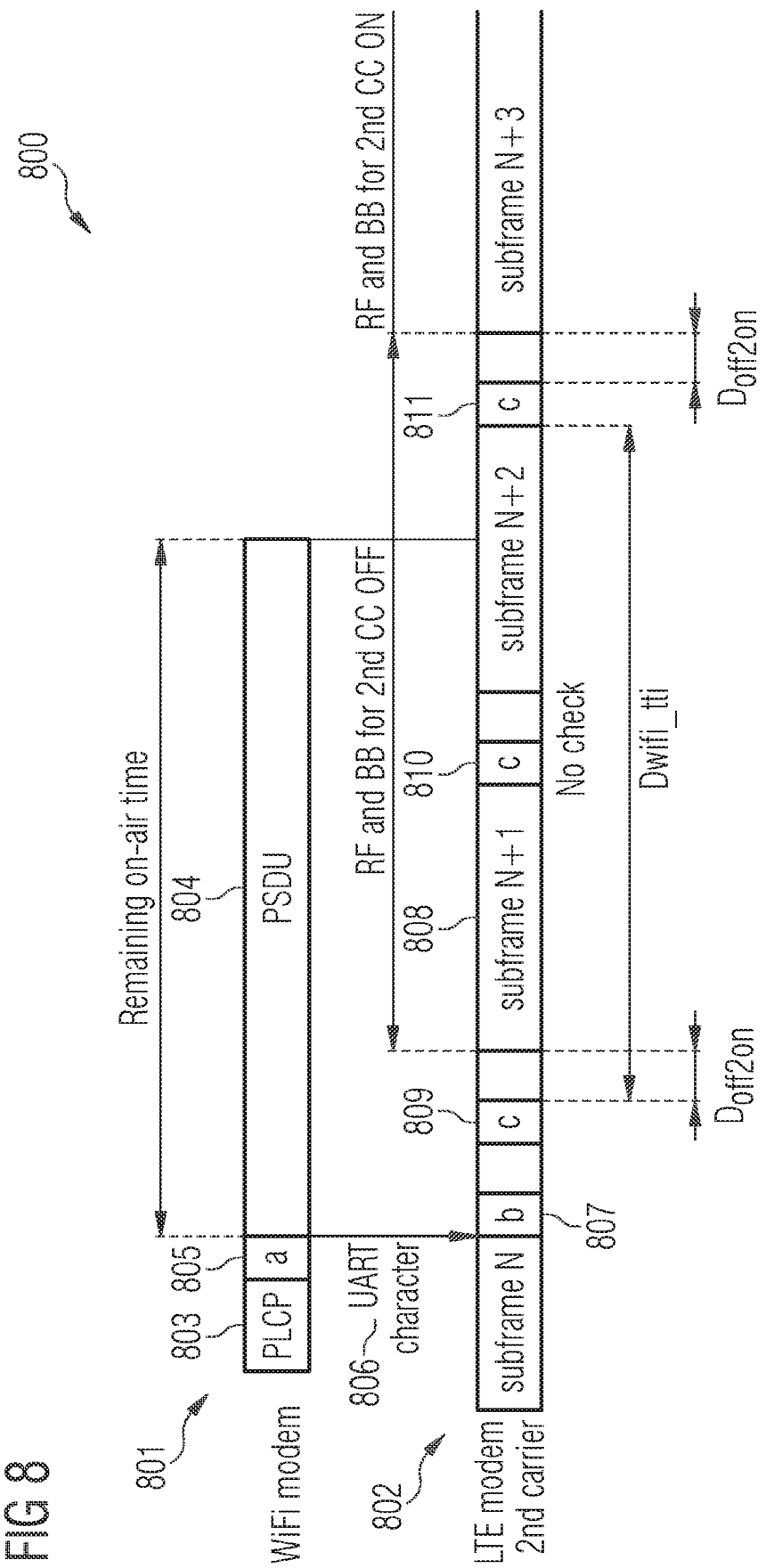
FIG. 8 shows a time diagram including a first diagram showing the activity of the WiFi modem and a second diagram showing the activity of the LTE Modem.

FIG. 8 shows a time diagram 800 including a first diagram 801 showing the activity of the WiFi modem 305 and a second diagram 802 showing the activity of the LTE Modem 304 (wherein the same horizontal position corresponds to the same time). Time flows from left to right in FIG. 8.

In 805, the WiFi modem 305 receives and successfully decodes a physical payer convergence procedure (PLCP) header 803 of a following PLCP Service Data Unit (PSDU) block 804 after it has synchronized with the PLCP preamble. Since the PLCP header 803 contains indications of the size of the PDSU 804 and the modulation/coding scheme used by the current WiFi packet (including PLCP 803 and PSDU 803), the WiFi modem 305 can derive the remaining on-air time for the current packet also taking its own processing latency into account.

The WiFi modem 305 may do this even if the current packet is not intended for the UE 302. The WiFi modem 305 then communicates the derived information to the LTE modem 304 via the IDC interface 307, e.g. by using a notification 806 in the form of one or more UART characters (which e.g. indicate the remaining on-air time).

When the LTE modem 304, in 807, receives the notification 806 about WiFi traffic, the LTE modem 304
  saves the notification if the LTE modem's receiver chain of the secondary carrier is inactive or
  if the receiver chain of the LTE modem's receiver chain of the secondary carrier is active, the LTE modem 304 decides whether to drop received OFDM symbols used for radio link reporting. It may take the decision for example based on a threshold for the WiFi receiving power at the WiFi modem 305: If the receiving power exceeds the threshold (e.g. set in advance), the WiFi modem 305 for example notifies the LTE modem 304 of strong interference and otherwise of weak interference. By this means, an overreaction of the LTE modem 304 in case of a weak WiFi signal can be avoided.

When the LTE modem 304 is about to start reception for the secondary carrier in a TTI (in this example subframe 808), it performs, at a checking point 809, a timing-driven checking, as explained in the following with reference to FIG. 9.

Figure 9:
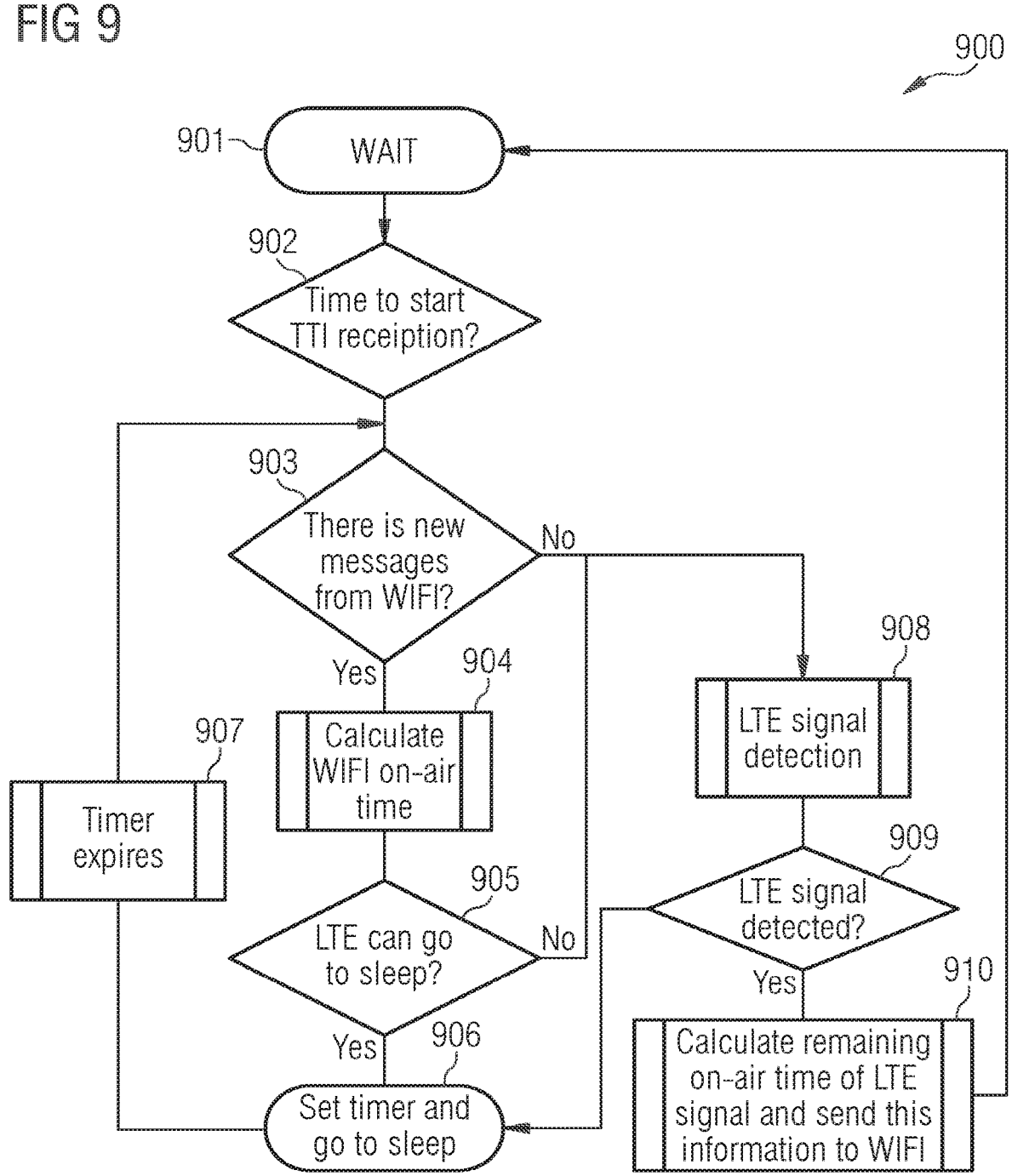
FIG. 9 shows a flow diagram illustrating a checking operation by the LTE modem.

FIG. 9 shows a flow diagram 900 illustrating a checking operation by the LTE modem 304.

In 901, the LTE modem 304 waits until a checking point is reached, e.g. checking point 809 is reached, i.e. when it is time to start reception for the secondary carrier in a TTI. The specific time of the checking point Tcheck depends on the current power state of the receiver chain for the secondary carrier:

When the receiver chain for the secondary carrier is in sleep mode, $T_{check}$ equals to $T_{tti} - D_{off2on} - \Delta$, where $T_{tti}$ is the timing distance of the boundary of the TTI boundary, $D_{off2on}$ is the duration required to activate the receiver chain (e.g. RF receiver and BB processor) and $\Delta$ denotes the IDC message processing delay which is assumed to be in the micro-second range and is therefore neglected FIG. 8.

When the receiver chain for the second carrier is active, $T_{check}$ equals to $T_{tti} - \Delta$.

When, in 902, the checking point $T_{check}$ has been reached, the LTE modem 304, e.g. an LTE baseband controller of the LTE modem 304 checks, in 903, for the presence of a WiFi traffic notification. If the LTE modem 304 has received a notification about WiFi traffic from the WiFi modem 305, the LTE baseband controller, in 904, calculates WiFi over-air period to see, in 905, whether the upcoming TTI (e.g. subframe 808) is occupied by WiFi signal. This can be done by stamping the arrival time of the notification.

If the respective communication medium (e.g. WiFi channel) is occupied by WiFi in the upcoming TTI 808 for a period $D_{wifi\_tti}$, the LTE baseband controller in 906 sets a sleep timer expiring after $D_{wifi\_tti}$ and puts the receiver chain for the secondary carrier (e.g. both RF receiver and BB processor) into sleep or power off mode and ignores the checking points (in this example a second checking point 810) during $D_{wifi\_tti}$. After the timer has expired in 907, the procedure continues with 903 (at a third checking point 811).

If, in 903, the LTE modem has not received a notification from the WiFi modem 304 or if, in 905, the LTE modem 304 determines that the medium is not occupied by WiFi in the upcoming TTI 808, the LTE modem 304 switches on the receiver chain for the secondary carrier (if not already powered on) and performs signal type detection in 908. If, in 909, the LTE modem 304 does not detect an LTE signal it continues with 906, i.e. sets a timer until the next checking point and sets the receiver chain for the secondary carrier to sleep.

In 910, the LTE modem 304 may pass on-air duration information in the other direction, i.e. from LTE modem 304 to WiFi 305 via the IDC interface 307. For example, the LTE modem 304 can notify the WiFi modem 305 of the remaining on-air duration of LTE communication for the current TTI via the IDC interface 307 after PDCCH decoding of a received LTE signal. The WiFi modem 304 may put itself into sleep during this duration. As an example, PDCCH decoding latency is targeted at around 500 μs. This for example leaves about 400-500 μs for the WiFi modem to be in sleep mode without channel sensing.

The on-air information passing can also be done in several stages if necessary. For example, once the LTE modem 304 detects an LTE signal type, it can notify the WiFi modem 305 of the time duration of the PDCCH period in advance. After successful PDCCH decoding, it further notifies the WiFi modem 305 about the remaining PDSCH duration.

It should further be noted that the LTE modem 304 can employ a simple learning mechanism to check whether LBT is deployed:

During an initial learning phase, the LTE modem 304 always (irrespective of a WiFi traffic notification from WiFi modem 305) activates signal type detection and compares the detection results with the WiFi on-air duration notified by the WiFi modem.

At the end of the learning phase, the LTE modem 304 determines the collision probability of the WiFi signal and the LTE signal and decides whether to activate the approach described above, i.e., to put one modem 304, 305 into sleep as the other's type of signal (LTE signal or WiFi signal) is on air. For example, when the determined collision probability exceeds a certain threshold, the LTE modem 304 decides that the base station 301 does not employ LBT and de-activates the approach described above. Otherwise, it activates it.

Such learning (and the corresponding forgetting, i.e. resetting) may be done location-specific assuming that an infrastructure does not change too frequently at a certain location. For example, the mobile terminal may use a cell ID of the radio cell via which it is served by the base station 301 as coarse location information.

FIG. 10 shows an example of a secondary carrier operation in LAA, when the WiFi AP 303 takes the medium to transmit to illustrate the power benefits which may be achieved with the approach described above.

As shown in FIG. 10, without prior knowledge about WiFi activity, for a TTI 1001, LTE has to take $D_{off2on}$, RF turn-on duration 1002 (before the start of the TTI 1001), $D_{on}$, signal type detection duration 1003 and $D_{on2off}$, RF turn-off duration 1004 into account to power down the receiver chain (RF and BB) for the secondary carrier for the period Doff 1005 during the TTI 1001.

$D_{off2on}$ is typically about 100 μs due to PLL (Phase Locked Loop) startup etc. $D_{on}$ is typically at least around 200 μs. The derivation of this value (i.e. around 200 μs) assumes that Cell-specific Reference Symbol (CRS) based signal type detection is adopted and one CRS symbol is sufficient for detection.

FFT (Fast Fourier Transform hardware latency is considered.

Therefore, the given estimate for $D_{on}$ can be considered as a best case number instead of a worst case estimate.

$D_{on2off}$ is typically around 150 μs for UE internal signaling and entire receiver chain shut-down. With all these factors considered, the receive chain needs to be active for about 450 μs (out of 1 ms TTI time). The approach described above thus allows saving the power consumed by the receiver chain for around 450 μs per TTI of 1 ms which is a significant power saving.

Further, the IDC approach described above allows modem performance improvement. Namely, in the case of LBT failures or a system without LBT being employed, the on-air duration of one modem (e.g. WiFi modem) can be treated as the interference duration to the other modem (e.g. LTE modem). Thus, the LTE receiver activity can be adjusted accordingly for performance (potentially also for power). For example, the LTE modem can drop those interfered reference OFDM symbols for CSI feedback calculation in order to provide more stable feedback information back to the eNodeB 301. The associated channel estimate from these OFDM symbols can also be skipped by using during time interpolation filtering, which is a well-accepted way to smooth channel estimation for performance improvement.

While specific aspects have been described, it should be understood by those skilled in the art that various changes in form and detail may be made therein without departing from the spirit and scope of the aspects of this disclosure as defined by the appended claims. The scope is thus indicated by the appended claims and all changes which come within the meaning and range of equivalency of the claims are therefore intended to be embraced.

The invention claimed is:

1. A communication terminal comprising:
   a first transceiver configured for communication according to a first radio access technology;
   a second transceiver configured for communication according to a second radio access technology;
   wherein the second transceiver is configured to determine whether a frequency range is occupied by a transmission according to the second radio access technology and to notify the first transceiver whether the frequency range is occupied by a transmission according to the second radio access technology; and
   wherein, when the frequency range is occupied by a transmission according to the second radio access technology:
      the first transceiver is configured to pause reception of signals transmitted in the frequency range based on the notification from the second transceiver; and
      the first transceiver is configured to enter a sleep mode.

2. The communication terminal of claim 1, wherein the first transceiver is configured to pause reception of signals transmitted in the frequency range until a time transmission interval starting time according to a frame structure of the first radio access technology at which the occupation by the transmission according to the second radio access technology has stopped.

3. The communication terminal of claim 1, wherein the first radio access technology is LTE and the first transceiver is an LTE modem.

4. The communication terminal of claim 1, wherein the second radio access technology is wireless local area netowrk radio access technology.

5. The apparatus of claim 1, wherein the first transceiver is configured to:
   wake from sleep at a predetermined transmission check time; and
   determine the period of transmission or reception of the second receiver upon waking from sleep.

6. An apparatus comprising
   a first transceiver configured for communication according to a first radio access technology;
   a second transceiver configured for communication according to a second radio access technology;
   wherein the second transceiver is configured to determine whether a frequency range is occupied by a transmission according to the second radio access technology and to notify the first transceiver whether the frequency range is occupied by a transmission according to the second radio access technology;
   wherein the notification includes a duration of the occupation of the frequency range by a transmission according to the second radio access technology; and
   wherein the first transceiver is configured to pause reception of signals transmitted in the frequency range until a time transmission interval starting time according to a frame structure of the first radio access technology at which the occupation by the transmission according to the second radio access technology is complete.

7. The apparatus of claim 6, wherein the first transceiver is configured to enter a sleep mode if the frequency range is occupied by a transmission according to the second radio access technology.

8. The apparatus of claim 6, wherein the first radio access technology is LTE and the first transceiver is an LTE modem.

9. The apparatus of claim 6, wherein the second radio access technology is wireless local area network radio access technology.

10. A communication terminal comprising
    a first transceiver configured for communication according to a first radio access technology;
    a second transceiver configured for communication according to a second radio access technology;
    wherein the second transceiver is configured to determine whether a frequency range is occupied by a transmission according to the second radio access technology, and if the frequency range is occupied by the transmission according to the second radio access technology, to notify the first transceiver of a first duration that the frequency range will be occupied by a transmission according to the second radio access technology;
    wherein the first transceiver is configured to perform a signal type detection during a second duration that is simultaneous or concurrent with the first duration; and
    determine a probability of collision between a signal according to the first radio access technology and a signal according to the second radio access technology.

11. The communication terminal of claim 10, further comprising, if the determined probability of collision exceeds a predetermined threshold, implementing a safety mode in which the first transceiver is put to sleep whenever the second transceiver receives or transmits a signal according to the second radio access technology.

12. The communication terminal of claim 10, further comprising, if the determined probability of collision exceeds a predetermined threshold, implementing a safety mode in which the second transceiver is put to sleep whenever the first transceiver receives or transmits a signal according to the first radio access technology.

13. The communication terminal of claim 10, wherein the first radio access technology is LTE and the first transceiver is an LTE modem.

14. The communication terminal of claim 10, wherein the second radio access technology is wireless local area network radio access technology.

15. An apparatus comprising
    a first transceiver configured for communication according to a first radio access technology;
    a second transceiver configured for communication according to a second radio access technology;
    wherein the second transceiver is configured to determine whether a frequency range is occupied by a transmission according to the second radio access technology and to notify the first transceiver whether the frequency range is occupied by a transmission according to the second radio access technology;
    wherein the first transceiver is further configured to:
      determine a period of transmission or reception of the second receiver according to the second radio access technology, based on the notification from the second transceiver; and
      if the determined period of transmission or reception of the second receiver extends into a next transmission time interval of the first transceiver according to the first radio access technology, enter a sleep mode.

16. The apparatus of claim 15, wherein the first transceiver is configured to determine the period of transmission or reception of the second receiver upon waking from sleep, and wherein the first transceiver is further configured to wake from sleep at a predetermined transmission check time.

17. The apparatus of claim 15, wherein the predetermined transmission check time is selected based on at least one of a timing distance of a transmission time boundary, an activation time of a receiver chain, or an IDC message processing delay.

18. The apparatus of claim 15, wherein the sleep mode includes the deactivation of at least one of a radio frequency receiver and a baseband receiver of the first transceiver.

19. The apparatus of claim 15, wherein the first radio access technology is LTE and the first transceiver is an LTE modem.

20. The apparatus of claim 15, wherein the second radio access technology is wireless local area network radio access technology.

\* \* \* \* \*